(12) United States Patent
Dillen et al.

(10) Patent No.: US 12,431,152 B2
(45) Date of Patent: Sep. 30, 2025

(54) APPARATUS AND METHOD FOR AUDIO ENCODING

(71) Applicant: KONINKLIJKE PHILIPS N.V., Eindhoven (NL)

(72) Inventors: Paulus Henricus Antonius Dillen, Eindhoven (NL); Franciscus Marinus Jozephus De Bont, Riethoven (NL); Jeroen Gerardus Henricus Koppens, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 208 days.

(21) Appl. No.: 17/765,002

(22) PCT Filed: Oct. 8, 2020

(86) PCT No.: PCT/EP2020/078297
§ 371 (c)(1),
(2) Date: Mar. 30, 2022

(87) PCT Pub. No.: WO2021/074007
PCT Pub. Date: Apr. 22, 2021

(65) Prior Publication Data
US 2022/0383885 A1    Dec. 1, 2022

(30) Foreign Application Priority Data

Oct. 14, 2019  (EP) ..................... 19202935

(51) Int. Cl.
*G10L 19/16*    (2013.01)
*G10L 19/008*   (2013.01)

(52) U.S. Cl.
CPC .......... *G10L 19/167* (2013.01); *G10L 19/008* (2013.01)

(58) Field of Classification Search
CPC ....... G10L 19/00; G10L 19/002; G10L 19/20; G10L 19/167; G10L 19/16; G10L 19/008;
(Continued)

(56) References Cited

U.S. PATENT DOCUMENTS

2012/0057715 A1*  3/2012  Johnston ............... H04S 7/30
                                                   381/63
2012/0310654 A1* 12/2012  Riedmiller ........... H03G 7/007
                                                   704/500

(Continued)

FOREIGN PATENT DOCUMENTS

EP         3605531 A1      2/2020
WO       2018047667 A1     3/2018
WO   WO-2018180531 A1 * 10/2018  ........... G10L 19/008

OTHER PUBLICATIONS

3GPP S4-190901 'IVAS pass-through mode' (Ericsson) Aug. 12-16, 2019.

(Continued)

*Primary Examiner* — Leshui Zhang

(57) ABSTRACT

An audio encoding apparatus comprises an audio receiver (201) receiving audio items representing an audio scene and a metadata receiver (203) receives input presentation metadata for the audio items describing presentation constraints for the rendering of the audio items. The presentation constraints constrain a rendering parameter that can be adapted when rendering the audio items. An audio encoder (205) generates encoded audio data for the audio scene by encoding the plurality of audio items with the encoding being adapted in response to the input presentation metadata. A metadata circuit (207) generates output presentation metadata from the input presentation metadata. The output presentation metadata comprises data for encoded audio items which constrain the extent by which an adaptable parameter of a rendering can be adapted when rendering the (Continued)

encoded audio items. An output (209) generates an encoded audio data stream comprising the encoded audio data and the output presentation metadata.

20 Claims, 3 Drawing Sheets

(58) Field of Classification Search
CPC ... G10L 19/0017; G10L 19/173; G10L 19/22; G10L 21/0316; G10L 25/18; G06F 3/165; G06F 3/16; G06F 3/162; G06F 3/038; H04S 7/00; H04S 3/00; H04S 3/008; H04S 7/30; H04S 7/304; H04S 7/302; H04S 7/303; H04S 2400/11; H04S 2400/05; H04S 2400/03; H04S 2400/01; H04S 2400/00; H04S 2400/09; H04S 2400/15; H04S 2400/13; H04S 2420/11; H04S 2420/07; H04S 2420/01; H04S 2420/03; H04S 2420/00; H04S 3/002; H04S 3/006; H04R 5/02; H04R 3/12; H04R 1/40; H04R 3/00; H04N 21/233; H04N 21/2353; H04N 21/235; H04N 21/2335; H04N 21/435; H04N 21/4394; H04N 21/439; H04N 21/2355
USPC ......... 704/500–504; 381/1–23, 300–311, 61, 381/63; 700/94
See application file for complete search history.

(56) References Cited

U.S. PATENT DOCUMENTS

| | | | |
|---|---|---|---|
| 2013/0246077 A1* | 9/2013 | Riedmiller | G10L 19/167 704/500 |
| 2014/0016786 A1* | 1/2014 | Sen | H04S 3/008 381/23 |
| 2014/0294200 A1* | 10/2014 | Baumgarte | G10L 19/008 381/107 |
| 2014/0297296 A1 | 10/2014 | Koppens et al. | |
| 2015/0332680 A1 | 11/2015 | Crockett et al. | |
| 2016/0142853 A1* | 5/2016 | Herre | H04S 3/002 381/23 |
| 2016/0157040 A1* | 6/2016 | Ertel | G10L 19/008 381/18 |
| 2019/0132674 A1* | 5/2019 | Vilkamo | H04R 5/04 |
| 2020/0043505 A1* | 2/2020 | Chinen | G10L 19/008 |

OTHER PUBLICATIONS

3GPP S4-190735 'On Input Audio and Session Metadata and Behavioral Requirements of the IVAS Decoder/Renderer' (Dolby) Jul. 1-5, 2019.
3GPP S4-190938 'On shared control metadata for IVAS input audio formats' (Nokia) Aug. 12-16, 2019.
3GPP S4-190940 'Input Audio and Session Metadata for the IVAS encoder' (Dolby) Apr. 12-16, 2019.
3GPP S4-190949 'On IVAS Codec Operation of Audio Objects' (Dolby) Aug. 12-16, 2019.
ISO/IEC JTC1/SC29/WG11 MPEG2018/m42604 'Discussion on 6DoF audio requirements for MPEG-I' Apr. 2018.
ISO/IEC JTC1/SC29/WG11 MPEG2018/m43534 'Updates to MPEG-I Phase 2 audio requirements' Jul. 2018.
ISO/IEC 23008-3:2019 (2nd edition)—'Information technology—High efficiency coding and media delivery in heterogeneous environments—Part 3: 3D audio' Oct. 12, 2016.
3GPP S4-190958 'Considerations about a pass-through mode' (Philips) Aug. 12-16, 2019.
3GPP S4-190963 'On the Importance of the Pass-Through Mode' (FhG) Aug. 12-16, 2019.
3GPP S4-190951 'On the Need for Pass-through Operation' (Dolby) Apr. 12-16, 2019.
3GPP SP-170611 'New WID on EVS Codec Extension for Immersive Voice and Audio Services' Sep. 13-15, 2017.
3GPP S4-191063 'IVAS-9 Usage Scenarios' v0.0.3 Aug. 12-16, 2019.
International Search Report and Written Opinion from PCT/EP2020/078297 mailed Feb. 4, 2021.
Tsingos et al "Perceptual Audio Rendering of Complex Virtual Environments" ECM Transactions on Graphics, vol. 23, No. 3, Aug. 1, 2004 p. 249-258.
Draft MPEG-I Audio Requirements Jul. 20, 2018.
Nokia Corp. "Examples of Object-Based Audio Control Metadata for Ivas" 3GPP Draft Apr. 2, 2019.
Paulus Jouni et al."MPEG-D Spatial Audio Object Coding for Dialogue Enhancement" May 6, 3025 p. 10-20.

* cited by examiner

APPARATUS AND METHOD FOR AUDIO ENCODING

CROSS-REFERENCE TO PRIOR APPLICATIONS

This application is the U.S. National Phase application under 35 U.S.C. § 371 of International Application No. PCT/EP2020/078297, filed on Oct. 8, 2020, which claims the benefit of EP Patent Application No. EP 19202935.3, filed on Oct. 14, 2019. These applications are hereby incorporated by reference herein.

FIELD OF THE INVENTION

The invention relates to an apparatus and method for audio encoding, and in particular, but not exclusively, for encoding of audio for dynamic applications, such as virtual reality applications.

BACKGROUND OF THE INVENTION

The variety and range of audio and video applications have increased substantially in recent years with new services and ways of utilizing and consuming audio, images and video being continuously developed and introduced.

For example, one service being increasingly popular is the provision of audio and images in such a way that the viewer is able to actively and dynamically interact with the system to change parameters of the rendering. A very appealing feature in many applications is the ability to change the effective viewing/listening position. Such a feature can specifically allow a virtual reality experience to be provided to a user.

The trend is towards providing increasing flexibility which allows rendering side adaptation of the scene. In order to provide increased rendering side flexibility for the rendering of the audio scene, a number of audio encoding and distribution approaches have been proposed where the audio scene may be represented by combinations of different audio items. For example, audio items may represent separate sound sources, such as specific speakers etc. In some approaches, all audio items are of the same type but increasingly systems are developed which allow multiple different audio types to simultaneously be used and supported. For example, some audio items may be audio channels, others may be separate audio objects, yet other may be scene based such as Ambisonic audio items, etc. In many systems, metadata may be provided together with the audio data that represents the audio items. Such metadata may for example indicate a nominal position in the scene for the audio source of an audio item.

Such approaches may enable a high degree of client/rendering side customization and adaptation. For example, the audio scene may be locally adapted to changes of the listeners virtual position in the audio scene or to the individual listener's particular preferences.

As a particular example, the 3GPP consortium is currently developing the so-called Immersive Voice and Audio Services (IVAS) codec. This codec will be able to code audio content in various configurations, such as channel, object, or scene (in particular, Ambisonics) based configurations. The purpose of the coding is to convey the audio information with a minimum amount of data.

The IVAS codec shall furthermore comprise a renderer to translate the various audio streams into a form suited for reproduction at the receiving end. E.g. audio can be mapped onto a known loudspeaker configuration, or audio could be rendered to a binaural format for reproduction via headphones.

In the 3GPP IVAS codec scope, work is ongoing to collect potential use cases. For these, it is envisaged that the codec should offer interactivity to modulate the rendering. E.g. headphones audio may have to be rendered head position and translation independent, which means it must be compensated for head movements. As another example, the user may be enabled to position audio items spatially, such as (re)positioning the objects carrying the audio of participants in a virtual meeting.

The renderer is considered part of the 3GPP IVAS codec work item and is seen as internal to the IVAS codec. However, it has been proposed that the codec also includes a pass-through mode. This mode would allow audio items to be represented at the decoder output in the same configuration(s) as they were input at the encoder input (i.e. as 1:1 corresponding channel, object and scene based audio items). Via a dedicated external rendering interface, an external renderer may have access to these items and may realize an alternative rendering to the internal IVAS renderer.

Such an approach may provide additional flexibility and increase the scope for customization and adaptation at the receiving end. However, the approach may also have associated disadvantages. For example, there is a trade-off between flexibility versus audio quality and complexity. It may typically be useful to restrict the freedom thereby allowing the content provider to retain some control of the rendering at the client side. This may not only assist the rendering and result in a rendered audio scene that is more realistic but may also allow the content provider to retain some control over the experience provided to the user. For example, it may prevent a renderer from generating an audio scene that is unrealistic and which may reflect poorly on the content and content provider.

It is envisaged that the encoded audio items can be supplemented by metadata that constrains how the renderer is allowed to render the audio items. This may in many situations allow improved trade-off between the different requirements. However, it may not be optimal in all situations and may for example require increased data rate, and may result in reduced flexibility and/or quality for the rendered audio scene.

Hence, an improved approach would be desirable. In particular, an approach that allows improved operation, increased flexibility, facilitated implementation, facilitated operation, reduced cost, reduced complexity, reduced data rate, improved perceived audio quality, improved rendering control, improved trade-offs, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio encoding apparatus comprising: an audio receiver for receiving a plurality of audio items representing an audio scene; a meta data receiver for receiving input presentation metadata for the plurality of audio items, the input presentation metadata describing presentation constraints for the rendering of the plurality of audio items, the presentation constraints constraining a rendering parameter that can be adapted when rendering the audio items; an audio encoder for generating encoded audio data for the audio scene by encoding the plurality of audio items, the encoding being in response to the input presentation metadata; a metadata circuit for generating output presentation metadata from the input presentation metadata, the output presentation metadata comprising data for encoded audio items which constrain the extent by which an adaptable parameter of a rendering can be adapted when rendering the encoded audio items; an output circuit for generating an encoded audio data stream comprising the encoded audio data and the output presentation metadata.

The invention may provide improved and/or more flexible encoding in many scenarios. The approach may in many embodiments allow an encoded audio data stream to be generated which provides an improved quality to bit rate ratio. The encoded audio data stream may be generated to allow some flexibility of rendering while also allowing some control of the rendering from the source/encoding side.

The presentation metadata for an audio item may constrain at least one of a spatial parameter and a volume parameter for a rendering of the audio item, including for example constraining a rendering position, gain level, signal level, spatial distribution, or reverberation property.

The audio encoder may be arranged to adapt the encoding of an audio item based on the input presentation metadata, and specifically based on input presentation metadata for the audio item. The adaptation may adapt a bit/data (rate) compression for the encoding of the audio item. The bitrate resulting from encoding an audio item may be adapted based on the input presentation metadata.

The input presentation metadata may describe presentation/rendering constraints for the received plurality of audio items. The encoded audio data may comprise audio data for a plurality of encoded audio items. The plurality of encoded audio items may be generated by encoding of the received plurality of audio items. The output presentation metadata describing presentation/rendering constraints for the rendering of the plurality of encoded audio items.

A presentation constraint may be a rendering constraint and may constrain a rendering parameter for an audio item. The rendering parameter may be a parameter of a rendering process and/or a property of the rendered signal.

The output presentation metadata may specifically be any data associated/linked with/provided for the encoded audio items generated by the audio encoder which constrain the extent by which one or more adaptable/variable aspects/properties/parameters of a presentation/rendering may/can be adapted when rendering the encoded audio items.

The output presentation metadata, and specifically the data for encoded audio items which constrain the extent by which an adaptable parameter of a rendering can be adapted when rendering the encoded audio items, may be generated by the metadata circuit in response to the presentation constraints constraining a rendering parameter that can be adapted when rendering the plurality of audio items.

The audio encoder may generate the encoded audio data to include a plurality of encoded audio items (by encoding the plurality of audio items).

In accordance with an optional feature of the invention, the audio encoder comprises a combiner for generating a combined audio item by combining at least a first audio item and a second audio item of the plurality of audio items in response to input presentation metadata for the first audio item and input presentation metadata for the second audio item, and the audio encoder is arranged to generate combined audio encoding data for the first and second audio item by encoding the combined audio item and to include the combined audio encoding data in the encoded audio data.

This may provide a particularly efficient encoding and/or flexibility in many embodiments. It may in particular provide efficient bitrate compression with reduced perceptual degradation in many embodiments.

In accordance with an optional feature of the invention, the combiner is arranged to select the first audio item and the second audio item from the plurality of audio items in response to the input presentation metadata for the first audio item and for the second audio item.

This may provide a particularly efficient encoding and/or flexibility in many embodiments.

In accordance with an optional feature of the invention, the combiner is arranged to select the first audio item and the second audio item in response to a determination that at least some input presentation metadata for the first audio item and input presentation metadata the second audio item meet a similarity criterion.

This may provide a particularly efficient encoding and/or flexibility in many embodiments. The similarity criterion may comprise a requirement that rendering constraints for a rendering parameter constrained by the presentation metadata meet a similarity criterion.

In accordance with an optional feature of the invention, the input presentation metadata for the first audio item and the input presentation metadata for the second audio item comprise at least one of a gain constraint and a position constraint.

This may provide particularly efficient operation in many embodiments.

In accordance with an optional feature of the invention, the audio encoder is further arranged to generate combined presentation metadata for the combined audio item in response to the input presentation metadata for the first audio item and the input presentation metadata for the second audio item; and to include the combined presentation metadata in the output presentation metadata.

This may provide improved operation in many embodiments and may in particular in many embodiments allow an encoder to treat combined audio items and encoded input audio items in the same way, and indeed without knowledge of whether the individual audio item is a combined audio item or not.

In accordance with an optional feature of the invention, the audio encoder is arranged to generate at least some combined presentation metadata to reflect a constraint for a presentation parameter for the combined audio item, the constraint being determined as a constraint meeting both a constraint for the first audio item indicated by input presentation metadata for the first audio item and a constraint for the second audio item indicated by input presentation metadata for the second audio item.

This may provide improved performance in many scenarios and applications.

In accordance with an optional feature of the invention, the audio encoder is arranged to adapt a compression of a first audio item in response to input presentation metadata for a second audio item.

The approach may typically allow an improved compression and encoding of an audio item. Compression may be a bit rate reduction and increasing compression may result in a reduced data rate of the encoded audio item. Compression may be bit rate reduction/compression. The audio encoding may be such that the encoded audio item representing one or more input audio items is represented by fewer bits than the one or more input audio items.

In accordance with an optional feature of the invention, the audio encoder is arranged to estimate a masking effect to the first audio item from the second audio item in response to input presentation metadata for the second audio item, and to adapt the compression of the first audio item in response to the masking effect.

This may provide a particularly efficient operation and improved performance in many embodiments.

In accordance with an optional feature of the invention, the audio encoder is arranged to estimate the masking effect to the first audio item from the second audio item in response to at least one of a gain constraint and a position constraint for the second audio item indicated by the input presentation metadata for the second audio item.

This may provide a particularly efficient operation and improved performance in many embodiments.

In accordance with an optional feature of the invention, the audio encoder is further arranged to adapt the compression of the first audio item in response to input presentation metadata for the first audio item.

This may provide particularly advantageous operation and/or performance in many embodiments.

In accordance with an optional feature of the invention, the input presentation metadata comprises priority data for at least some audio items and the encoder is arranged to adapt a compression for a first audio item in response to a priority indication for the first audio item in the input presentation metadata.

This may provide particularly advantageous operation and/or performance in many embodiments.

In accordance with an optional feature of the invention, the audio encoder is arranged to generate encoding adaptation data indicative of how the encoding is adapted in response to the input presentation metadata and to include the encoding adaptation data in the encoded audio data stream.

This may provide particularly advantageous operation and/or performance in many embodiments. It may in particular allow improved adaptation by the decoder to match the encoding process.

According to an aspect of the invention there is provided a method of encoding audio, the method comprising: receiving a plurality of audio items representing an audio scene; receiving input presentation metadata for the plurality of audio items, the input presentation metadata describing presentation constraints for the rendering of the plurality of audio items, the presentation constraints constraining a rendering parameter that can be adapted when rendering the audio items; generating encoded audio data for the audio scene by encoding the plurality of audio items, the encoding being in response to the input presentation metadata; generating output presentation metadata from the input presentation metadata, the output presentation metadata comprising data for encoded audio items which constrain the extent by which an adaptable parameter of a rendering can be adapted when rendering the encoded audio items; and generating an encoded audio data stream comprising the encoded audio data and the output presentation metadata.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description will focus on an audio encoding and decoding system that may be compatible with the 3GPP Immersive Voice and Audio Services (IVAS) codec but it will be appreciated that the described principles and concepts may be used in many other applications and embodiments.

Figure 1:
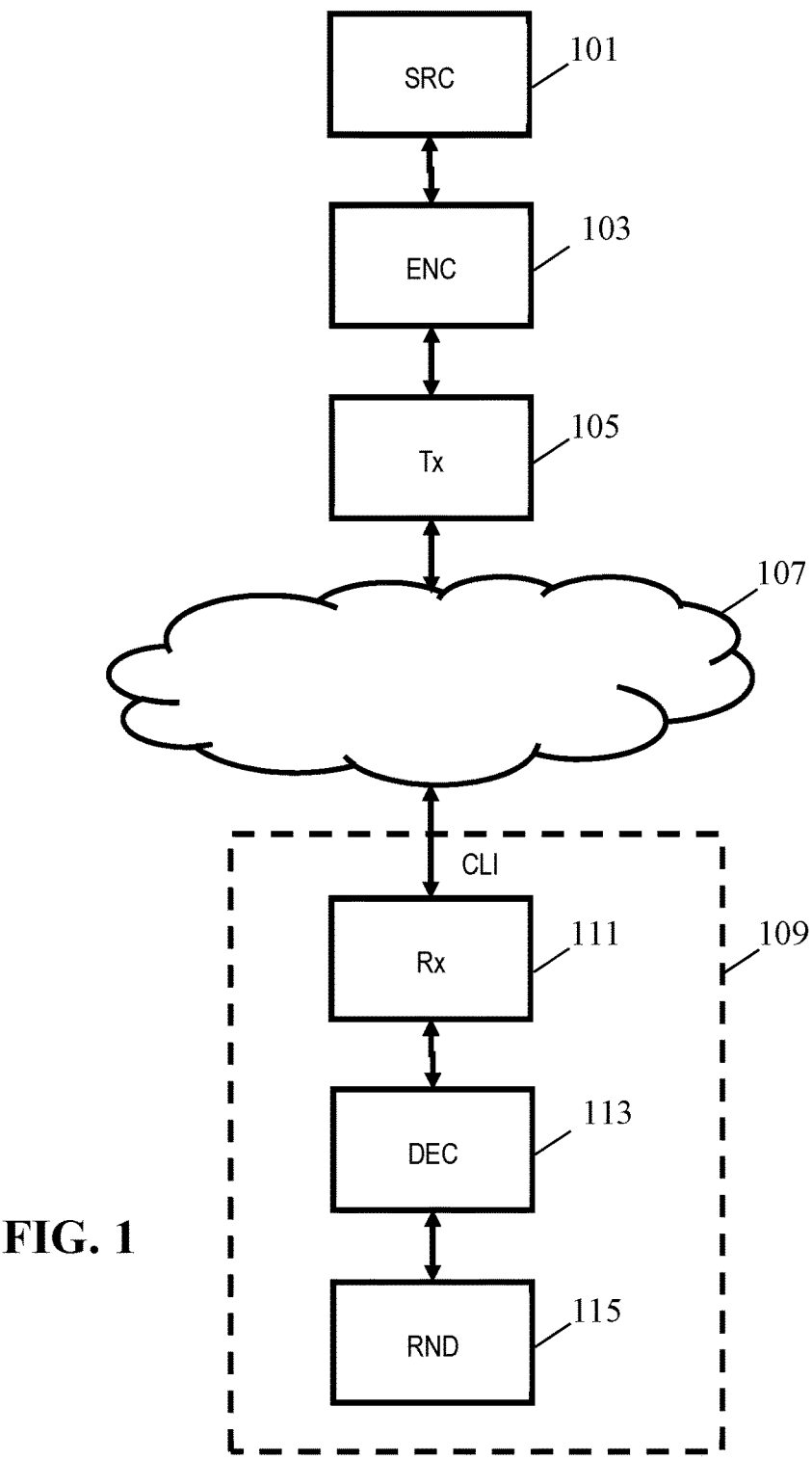
FIG. 1 illustrates an example of elements of an audio distribution system in accordance with some embodiments of the invention.

FIG. 1 illustrates an example of an audio encoding system. In the system, an audio source 101 provides audio data to an audio encoder unit 103. The audio data comprises audio data for a plurality of audio items that represent audio of an audio scene. The audio items may be provided as different types including specifically:

Channel based audio items: For such audio items, 1D (monaural), 2D or 3D spatial audio content is typically represented as discrete signals, intended to be presented via loudspeakers at predetermined positions relative to the listener. Well-known loudspeaker setups are e.g. two-channel stereo (also known as '2.0'), or 5 channels around the listener plus a low-frequency effects channel (also named '5.1'). Also binaural audio is typically considered to be channel based audio consisting of two audio signal channels intended to be presented directly to the listener's respective ears (normally via headphones).

Object based audio items: For such audio items, individual audio signals are typically used to represent distinct sound sources. These sound sources often relate to actual objects or persons e.g. participants in a teleconference. The signals are typically mono but other representations may also be used. Object based audio signals are often accompanied by metadata describing further properties, such as the extent (spatial spread), directivity or diffuseness of the object audio.

Scene based audio items: For such audio items, the original 2D or 3D spatial audio scene is typically represented as a number of audio signals, relating to certain spherical harmonics. By means of combining these scene based audio signals, presentable audio signals can be constructed at arbitrary 2D or 3D positions, e.g. at the position of a an actual loudspeaker in the audio reproduction setup. An example implementation of scene based audio is Ambisonics. Scene-based audio uses a sound-field technology called "higher-order ambisonics" (HOA) to create holistic descriptions of both live-captured and artistically created sound scenes that are independent of specific loudspeaker layouts.

In addition to the audio data, the audio source may provide presentation metadata for the audio items. The presentation metadata may describe presentation constraints for the rendering of the audio scene, and may thus provide presentation/rendering constraints for the plurality of audio items.

The presentation metadata may describe a constraint in how a rendering of the audio items is to be performed by a renderer. The presentation metadata may define a constraint on one or more rendering parameters/properties. The parameter/property may specifically be one that impacts a perceptual property of the rendering of an audio item. The constraint may be a constraint that affects the spatial perception and/or the (relative) signal level of an audio item in the scene. The presentation metadata may specifically constrain a spatial and/or gain/signal level parameter for one or more audio items. The metadata may for example be a constraint on the position and/or gain for each audio item.

The metadata may for example describe a range or set of allowable values for one or more parameters of one or more audio items. The rendering of the audio item(s) may be performed freely within the constraint, i.e. the rendering may be such that the constrained parameters have any of the indicated allowable values but may not be such that the constrained parameter does not have this value.

As an example, the presentation metadata may for one or more of the audio items describe a region and/or a (relative) gain range. The audio item must then be rendered with a perceived position within the region and/or with a gain within the gain range.

The presentation metadata may thus constrain the rendering while still allowing some flexibility to adapt and customize the local rendering.

Examples of rendering constraints of parameters or properties that may be provided by the presentation metadata include:

A position constraint for one or more audio items. This may for example define a spatial region or volume in the audio scene from which the audio item must be rendered.

A reverberation constraint for one or more audio items. This may for example define a minimum or maximum reverberation time. The constraint may for example ensure that the audio item is rendered with a desired degree of diffuseness. For example, an audio item representing general ambient background sound may be required to be rendered with a minimum amount of reverberation whereas an audio item representing a main speaker may be required to be rendered with less than a given threshold of reverberation A gain constraint. The rendering of an audio item may be adapted by the renderer to be louder or quieter in accordance with the specific preferences of the rendering process. For example, the gain for a speaker relative to ambient background sounds may in some cases be increased or decreased based on the listeners preferences. However, a gain constraint may constrain how much the gain may be modified, e.g. thereby ensuring that the speaker can always be heard over the ambient noise.

A loudness constraint. The rendering of an audio item may be adapted by the renderer to be louder or quieter in accordance with the specific preferences of the rendering process. For example, the gain for teleconference participants may in some cases be increased or decreased based on the listener's preferences. However, a loudness constraint may constrain how much the perceived loudness of certain participants may be modified, e.g. thereby ensuring that e.g. the meeting chairperson can always be heard sufficiently loudly in presence of other speakers or background noise.

A dynamic range control constraint. The dynamic range of an audio item may be adapted by the renderer to be louder, e.g. it may be reduced so that the audio stays audible also during periods of lower level in the presence of background noise at the listeners position. For example, a violin sound may be automatically be made louder at low levels. However, a dynamic range control constraint may constrain by how much the dynamic range can be reduced, thus e.g. ensuring a sufficiently natural perception of the violin's normal dynamics.

Presentation metadata describing presentation constraints for the rendering of the plurality of audio items may specifically be data providing constraints on a rendering parameter or property that can be adapted when rendering the audio items (for which the presentation metadata is provided). The rendering parameter or property may be a parameter/property of the rendering operation and/or a parameter or property of the generated rendered/presented signal and/or audio.

The input presentation metadata may specifically be any data associated/linked with/provided for the input audio items for the audio encoder 205 which constrain the extent by which one or more adaptable/variable aspects/properties/parameters of the presentation/rendering may/can be adapted when rendering the input audio items.

The audio encoder unit 103 is arranged to generate an encoded audio data stream which includes encoded audio data for the audio scene. The encoded audio data is generated by encoding the audio items (i.e. the received audio data representing the audio items). In addition, the audio encoder unit 103 generates output presentation metadata for the encoded audio items and includes this metadata in the encoded audio data stream. The output presentation metadata describes rendering constraints for the encoded audio items.

The output presentation metadata may specifically be any data associated/linked with/provided for the encoded audio items generated by the audio encoder 205 which constrain the extent by which one or more adaptable/variable aspects/properties/parameters of a presentation/rendering may/can be adapted when rendering the encoded audio items.

The output presentation metadata, and specifically the data for the encoded audio items which constrain the extent by which an adaptable parameter of a rendering can be adapted when rendering the encoded audio items, may be generated by the metadata circuit in response to (input) presentation constraints constraining a rendering parameter that can be adapted when rendering the plurality of (input) audio items.

The audio encoder unit 103 is coupled to a transmitter 105 which is fed the encoded audio data stream. The transmitter 105 is in the example arranged to transmit/distribute the encoded audio data stream to one or more clients which may render the audio scene based on the encoded audio data stream.

In the example, the encoded audio data stream is distributed via a network 107 which specifically may be or may include the Internet. The transmitter 105 may be arranged to simultaneously support a potentially large number of clients and the audio data may be distributed to a plurality of clients in general.

In the specific example, the encoded audio data stream may be transmitted to one or more rendering devices 109. A rendering device 109 may include a receiver 111 which receives the encoded audio data stream from the network 107.

It will be appreciated that the transmitter 105 and receiver 111 may communicate in any suitable form and using any suitable communication protocol, standard, technique, and functionality. In the example, the transmitter 105 and receiver 111 may comprise appropriate network interface functionality but it will be appreciated that in other embodiments, the transmitter 105 and/or receiver 111 may for example include radio communication functionality, fiber optical communication functionality etc.

The receiver 111 is coupled to a decoder 113 which is fed the received encoded audio data stream. The decoder 113 is arranged to decode the encoded audio data stream to recreate the audio items. The decoder 113 may further decode the presentation metadata from the encoded audio data stream.

The decoder 113 is coupled to a renderer 115 which is fed the decoded audio data for the audio items and the presentation metadata. The renderer 115 may render the audio scene by rendering the audio items based on the received presentation metadata. The rendering by the renderer 115 may be targeted to the specific audio reproduction system used. For example, for a 5.1 surround sound system, audio signals for the individual channels may be generated, for a headphone system binaural signals may be generated using e.g. HRTF filters etc. It will be appreciated that many different possible audio rendering algorithms and techniques are known and that any suitable approach may be used without detracting from the invention.

The renderer 115 may specifically generate output audio signals for reproduction such that the combined reproduction provides a perception of the audio scene when perceived by a listener. The renderer will typically process different audio items separately and differently depending on the specific characteristics for the individual audio item, and then combine the resulting signal components for each output channel. For example, for an audio object audio item, signal components may be generated for each output channel depending on the desired position in the audio scene for an audio source corresponding to the audio object. An audio channel audio item may for example be rendered by generation of a signal component for a corresponding output reproduction channel, or e.g. by a plurality of reproduction channels if it does not map exactly to one of the reproduction channels (e.g. using panning or upmixing techniques if appropriate).

The representation of the audio scene by a number of typically different types of audio items may allow the renderer 115 a high degree of flexibility and adaptability in the rendering of the scene. This may for example be used by the renderer to adapt and customize the rendered audio scene. For example, the relative gain and/or position of different audio objects may be adapted, the frequency content of audio items may be modified, the dynamic range of audio items may be controlled, reverberation properties may be changed, etc. Thus, the renderer 115 may generate an output where the audio scene is adapted to the specific preferences for the current application/rendering, including adaptation to the specific reproduction system used and/or to the listener's personal preferences. The approach may for example also allow efficient local adaptation of the rendered audio scene to changes in the virtual listening position in the audio scene. For example, in order to support a virtual reality application, the renderer 115 may dynamically and continuously receive a user position data input and adapt the rendering in response to changes in the indicated virtual position of the user in the audio scene.

The renderer 115 is arranged to render the audio items based on the received presentation metadata. In particular, the presentation metadata may indicate constraints on a variable aspect/property/parameter of the rendering of the encoded/decoded audio items, and the renderer 115 may comply with these constraints when rendering.

The output audio signals from the renderer 115/rendering device 109 result from a rendering operation applied to the decoded audio items generated by the decoder 113 from the received encoded audio data stream. The rendering operation may have some parameters that can be adapted externally or locally and which perceptually affect (aspects of) the rendered output audio. The presentation metadata describing presentation constraints for the rendering may specifically be data which limits the set (i.e. for continuously adaptable parameters the value range, or for enumerative parameters the set of discrete values) by which the rendering parameters may be adapted when rendering.

Figure 2:
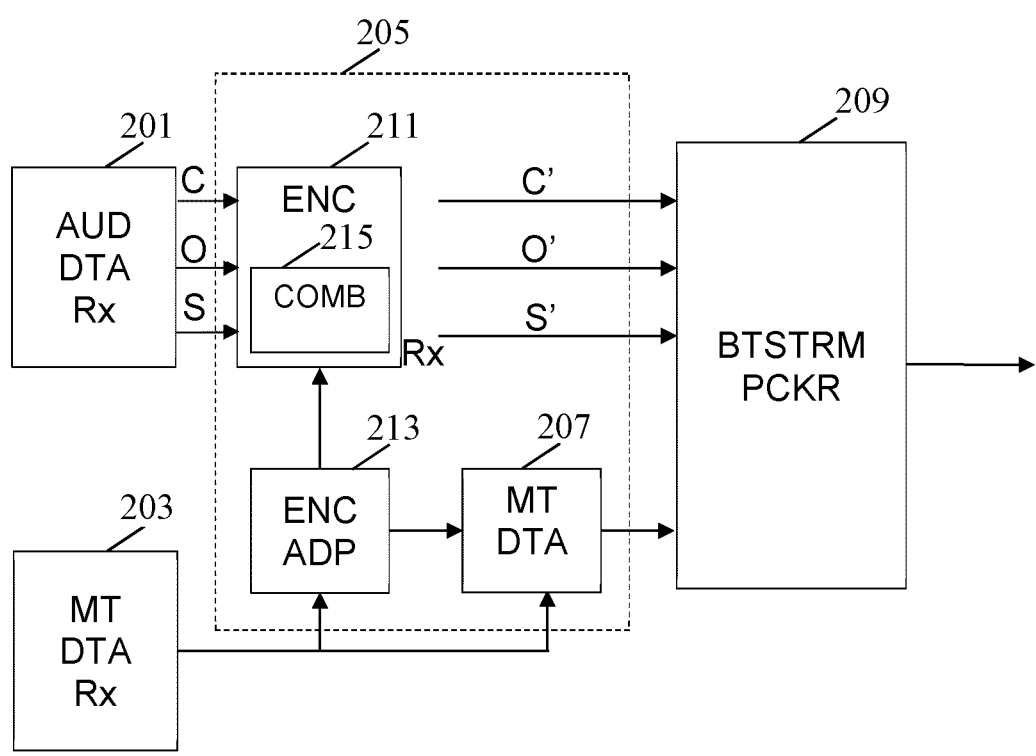
FIG. 2 illustrates an example of elements of an audio encoding apparatus in accordance with some embodiments of the invention.

FIG. 2 shows an example of elements of the audio encoder unit 103 in more detail. In the example, audio encoder unit 103 comprises an audio receiver 201 which receives the input audio data describing the scene. In the present example, the audio scene is represented by three different types of audio data, namely channel based audio items C, object based audio items O, and scene based audio items S. The audio items are provided by audio data which may be in any suitable form. The audio data may for example provide audio items as raw WAV files or as audio encoded in accordance with any suitable format. Typically, the input audio items will be at a high audio quality and high data rate.

The audio encoder unit 103 further comprises a metadata receiver 203 which is arranged to receive presentation metadata for the input audio items. As previously described, the presentation metadata may provide constraints on the rendering of the audio items.

The audio receiver 201 and the metadata receiver 203 are coupled to an audio encoder 205 which is arranged to generate encoded audio data for the audio scene by encoding the received audio items. The audio encoder 205 in the example specifically generates encoded audio items, i.e. audio items represented by encoded audio data. As for the input audio items, the output/encoded audio items may also be different types of audio items, and in the specific example may specifically be channel based audio C', object based audio items O', and scene based audio items S'.

One, some, or all of the encoded audio items may be generated by independently encoding the input audio items, i.e. an encoded audio item may be an encoded input audio item. However, in some scenarios, one or more of the encoded audio items may be generated to represent a plurality of input audio items or an input audio item may be represented in/by a plurality of encoded audio items.

It will be appreciated that many encoding algorithms and techniques are known and that any suitable algorithm, standard, and approach may be used. It will also be appreciated that different algorithms and techniques may be used for different audio items. For example, an audio item corresponding to music may be encoded using an AAC encoding approach, an audio item corresponding to speech may be encoded using a CELP encoding approach etc. For audio items that are already received in an encoded format, the encoding by the audio encoder 205 may be a transcoding to a different encoding format, or may e.g. simply be data rate conversion (e.g. by modifying quantization and/or clipping levels). Typically, the encoding includes bit rate compression and the encoded audio items are represented by fewer bits than the input audio items.

The audio encoder unit 103 further comprises a metadata circuit 207 which is arranged to generate output presentation metadata for the encoded audio items. The presentation metadata circuit 207 is arranged to generate this output presentation metadata from the received input presentation metadata. Indeed, for many audio items, the output presentation metadata may be the same as the input presentation metadata. For one or more audio items, the output presentation metadata may be modified as will be described in more detail later.

The audio encoder 205 and the metadata circuit 207 are coupled to an output circuit 209 which is arranged to generate an encoded audio data stream which comprises the encoded audio data and the output presentation metadata. The output circuit 209 may specifically be a bitstream packer which generates an encoded audio data stream that includes both the encoded audio data and the output metadata. The encoded audio data stream may be generated in accordance with a standardized format thereby allowing it to be interpreted by a range of receivers.

Thus, the output circuit 209 operates as a bitstream packer which accepts the bitrate reduced/encoded audio items and the output presentation metadata and combines these into a bitstream that can be conveyed over a suitable communication channel, such as e.g. over a 5G network.

Figure 3:
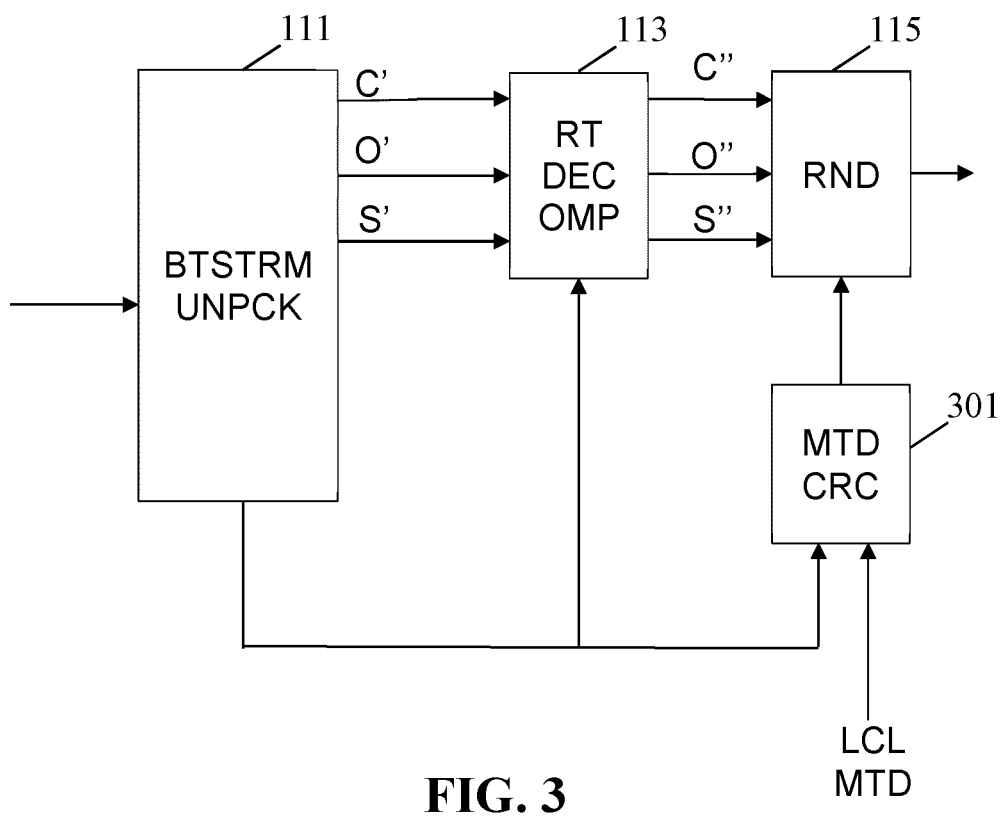
FIG. 3 illustrates an example of elements of an audio decoding apparatus in accordance with some embodiments of the invention.

FIG. 3 illustrates a specific example of elements of a rendering device 109 that may receive and process the encoded audio data stream from the audio encoder unit 103. The rendering device 109 comprises a receiver 111 in the form of a bitstream unpacker which receives the encoded audio data stream from the audio encoder unit 103 and which separates out the different data from the received data stream. Specifically, the receiver 111 may separate out the individual audio data for the encoded audio items and feed these to the decoder 113.

The decoder 113 is specifically arranged to decode the received encoded audio items to generate typically unencoded representations of channel, object, and scene based audio items.

For many audio items, the decoder 113 may reverse the encoding performed by the audio encoder 205. For other audio items, the decoding may e.g. only partially reverse the encoding operation. For example, if the audio encoder 205 has combined audio items into a single combined audio item, the decoder 113 may decode only the combined audio item and not fully generate the individual audio items. It will be appreciated that any suitable decoding algorithm and technique may be used depending on the specific preferences and requirements of the individual embodiment.

The decoded audio items are fed to the renderer 115 which is arranged to render the audio scene by rendering the audio items as previously described e.g. as a binaural signal or a surround sound signal.

The rendering device 109 further comprises a metadata controller/circuit 301 which is fed the presentation metadata from the receiver 111. In the example, the metadata controller 301 may also receive local presentation metadata which for example may reflect local preferences or requirements, such as e.g. individual user preferences or properties of the reproduction system used.

Thus, in addition to the audio presentation metadata unpacked from the received bitstream, the rendering device 109 may also accept local audio presentation metadata which e.g. may be provided via one or more input interfaces. This data may provide information about the context in which the audio is to be presented that is not available at the encoder side, such as e.g:
- the desired presentation (loudspeaker) configuration;
- a user preference (e.g. audio levels and orientations of participants' audio in a virtual meeting);
- properties of the local acoustics, such as e.g. the reverberance of the room. This may allow the renderer to determine which ambience effects and properties to apply to the audio items;
- local audio signals (e.g. to take into account when selecting a gain for audio items;
- listener location; and
- listener head orientation.

The metadata controller 301 may merge the received and local metadata together and provide it to the renderer 115 which may proceed to render the audio items in accordance with the constraints of the presentation metadata.

The renderer 115 may combine the audio items C", O" and S" generated by the decoder 113 into presentable audio of the desired presentation configuration (e.g. binaural or surround sound).

The renderer 115 may specifically generate an audio presentation in accordance with the metadata received from the metadata controller 301 and with the rendered audio being constrained by constraints of the received presentation metadata, i.e. constrained from the encoder side. This provides source side/content provider control over the audio rendering and the presented audio scene while still allowing some flexibility at the client side. This might e.g. be used to provide a service or application wherein a content author retains control of an immersive application which has been designed to offer a certain limited control to the end user etc.

In more detail, the metadata controller 301 may process the received metadata, e.g. suppression of audio items, accordingly the local metadata. The metadata controller 301 may e.g. restrict the local metadata, e.g. range of rotation or elevation, accordingly the received metadata.

In some embodiments, the renderer 115 may be a different device or functional entity than the rendering device 109. For example, a standard such as the envisaged 3GPP IVAS codec may prescribe the operation of the decoder 113 but allow the renderer 115 to be proprietary and more freely adaptable. In some embodiments, the metadata controller 301 may be part of a different device or functional entity.

In such an embodiment, the external renderer is thus required to process and interpret the decoded audio items O", C", S" and the received presentation metadata. The rendering operation by the external renderer must still conform to the constraints provided by the presentation metadata.

The presentation metadata may thus be data which is used by the source side/content provider to control the rendering operation at the clients. The rendering must be adapted/restricted in accordance with the presentation metadata.

However, in addition to the presentation metadata being used to control the rendering by the client side renderer 115, the audio encoder 205 of the audio encoder unit 103 is also arranged to adapt the encoding in response to the input presentation metadata. The input presentation metadata is fed to the audio encoder 205 and this may modify the encoding of one or more audio items based on the presentation metadata (typically for that one or more audio items). The audio encoder 205 is thus an adaptable encoder which is responsive to the presentation metadata received with the audio items.

The audio encoder 205 specifically comprises an encoding circuit 211 which is arranged to perform the encoding of the audio items and an encoding adapter 213 which is arranged to adapt the encoding by the encoding circuit 211 based on the presentation metadata.

The encoding adapter 213 may be arranged to set a parameter of the encoding for a given audio item based on the presentation metadata for that audio item. For example, it may be arranged to set a bit rate allocation/target, a quantization level, a masking threshold, a frequency range etc. for the encoding based e.g. on a gain range or position range indicated by the presentation metadata to be allowable for the audio item.

In many embodiments, the encoding circuit 211 is a bitrate compressor which is arranged to encode the audio items with a reduced number of bits compared to the received input audio items. The encoding may accordingly be a bitrate compression thereby allowing a more efficient and easier to distribute encoded audio data stream to be generated. In such embodiments, the encoding adapter 213 may adapt the bitrate reduction of the encoding circuit 211 based on the presentation metadata (so as to optimize the quality of the rendered audio in accordance with a suitable optimization criterion/algorithm).

The encoding adapter 213 may for example execute a coding analysis process that analyses presentation metadata and makes decisions on how to best perform bitrate reduction of the various input audio items. Examples of the operations and adaptation that may be performed by the encoding adapter 213 include:

- Signaling the (minimum) masking levels for the encoding circuit 211 to adhere to for the bitrate reduction. The encoding adapter 213 has information relating to which audio items are co-presented and at what levels and at which orientation. This may allow it to adapt a masking level for individual audio items with the masking levels then being used by the encoding.
- Converting audio items, e.g. move audio objects into channel or scene based audio.
- Selecting audio items for downmixing (with associated upmix parameters) where the downmix may be upmixed to reconstruct the immersive audio at the decoder side while ensuring that the artefacts of the parametric downmix coding are sufficiently masked by the various audio items that are presented together. As further refinements the encoding adapter 213 could
  - optimize the downmixing/upmixing gains for maximum performance/minimum artefacts;
  - choose upmixing parameters with optimum time/frequency characteristics.
- Irreversibly combining audio items into combined audio items that may then be rendered as a single audio item by the renderer 115. This may exploit that there is no inherent need to have all audio information separately available at the rendering side. For example, if separate adaptation of some input audio items is not allowed (e.g. they may be required to be rendered with the same position), it is not necessary to have the audio items individually available. E.g. multiple input audio objects with similar orientation and gain adaptation constraints can be combined into one scene based audio item, where during rendering the gain and orientation for the scene as a whole can still be adapted, but the former objects will have fixed relative audio levels and fixed relative positions in the scene.
- Allocating different bitrate budgets to different audio items dependent on the presentation metadata for the audio items. For example, bitrate may be allocated to audio items based on the amount of unmasked information they each represent.

The encoding circuit 211 may then employ coding of the audio items in accordance with coding control data generated by the encoding adapter 213. For example, the encoding circuit 211 may generate bitrate reduced (e.g. quantized, parametrized . . . ) versions of some channel, object and scene based audio items. Further, due to e.g. combination or conversion as part of the encoding of different audio items, at least some of the encoded audio items may represent different audio information than the input audio items, i.e. there may not be a direct correspondence between input audio items and encoded audio items.

In some embodiments, the audio encoder 205 may specifically comprise a combiner 215 which is arranged to combine input audio items into one or more combined audio items. The combiner 215 may specifically combine a first and second input audio item into a combined audio item. The combined audio item may then be encoded to generate a combined encoded audio item and this combined encoded audio item may be included in the encoded audio data stream, typically replacing the first and second audio item. Thus, rather than individually encoding the first and second audio items, the combiner 215 may combine them into a single encoded audio item which is then included in the encoded audio data stream whereas no individual encoded audio data is included for the first or second audio items respectively.

The combination of the audio items is performed in response to the received presentation metadata. In many embodiments, the audio items that are selected for combination are selected based on the presentation metadata. For example, the encoding adapter 213 may select audio items for combination in response to a criterion that includes a requirement that constraints for the audio items meet a similarity criterion.

For example, it may be required that for audio items to be combined the constraints for the audio items as indicated by the presentation metadata must not be contradictory, i.e. it must be possible to meet both constraints. Thus, it may be required that the constraints indicated by the presentation metadata are not conflicting, and e.g. that the constraints have at least an overlap such that at least one rendering parameter value exists that allows rendering constraints for both (or all) audio items that are combined to be met. The encoding adapter 213 may require that the presentation metadata do not describe incompatible constraints for a common rendering parameter.

For example, the presentation metadata may describe constraints for a position of the audio items in the audio scene. In such a case, it may be required that the position constraints must be overlapping and that some common allowable positions must exist.

The selection of the audio items to combine may be based on the presentation metadata for the audio items. Thus, the selection of a first and second audio item for combination may be based on the presentation metadata for the first and second audio item. For example, as mentioned above, it may be required that the presentation metadata for the first and second audio items do not define conflicting constraints.

In some embodiments, the first and second audio items may e.g. be selected to be audio items that have constraints for the same parameter that are e.g. the most similar. For example, audio items that have substantially the same position constraints may be selected.

Specifically, a similarity measure for two audio items may be determined to reflect the overlap between allowable positions. For example, a similarity measure may be generated as the ratio between the volume of a region of overlapping allowable positions relative to the sum of the volumes of the individual allowable positions for the two audio items.

As another example, multiple audio objects meeting a similarity criterion for their position adaptation constraints, even while the respective position ranges or spatial volumes may not overlap, can be combined into a scene based audio item, where the audio sources will from thereon have fixed relative orientations to each other in the scene based audio (i.e. not be separately adaptable), but the their orientations can still be adapted together as a whole.

As another example, a similarity measure may be generated to reflect the size of an overlapping gain range for two audio items. The larger the common allowable gain range, the larger the similarity.

The encoding adapter 213 may evaluate such similarity measures for different pairs of audio items and select e.g. pairs for which the similarity measures are higher than a given threshold. These audio items may then be combined into single combined audio items.

In many embodiments, the encoding adapter 213 is further arranged to generate combined presentation metadata for the combined audio item from the input presentation metadata. This presentation metadata is then fed to the bitstream packer 209 which includes it in the output encoded audio data stream.

The metadata circuit 207 may specifically generate combined presentation metadata which is linked to the combined audio item and which provides rendering constraints for the combined presentation metadata. The generated combined audio item with associated combined presentation metadata may then be treated as any other audio item, and indeed the client/decoder/renderer may not even be aware that the combined audio item is indeed generated by a combination of input audio items by the audio encoder 205. Rather, the combined audio item and associated presentation metadata may to the client side be indistinguishable from input audio items and associated presentation metadata, and may be rendered as any other audio item.

In many embodiments, combined presentation metadata may for example be generated to reflect a constraint for a presentation parameter for the combined audio item. The constraint may be determined such that it meets the individual constraints for the audio items being combined as indicated by the input presentation metadata for these audio items. Specifically, the constraint for a combined audio item for a first and second audio item may be determined as a constraint meeting both a constraint for the first audio item indicated by input presentation metadata for the first audio and a constraint for the second audio item indicated by input presentation metadata for the second audio item. Thus, the combined presentation metadata is generated to provide one or more constraints that ensure that individual constraints on the individual audio items are met provided the combined constraint is met.

For example, for a first audio item being an audio object, the input presentation metadata may indicate that it must be rendered with a relative gain in the range from, say, −6 dB to 0 dB, and at a position within a coordinate volume of (azimuth, elevation, radius) of, say, ([0,100], [−40,60], [0.5, 1.5]). For a second audio item being an audio object, the input presentation metadata may indicate that it must be rendered with a relative gain in the range from, say, −3 dB to 3 dB, and at a position within a coordinate volume of (azimuth, elevation, radius) of, say, ([−100, 80], [−20,70], [0.2, 1.0]). In this case, the combined presentation metadata may be generated to indicate that the combined audio item being an audio object must be rendered with a relative gain in the range from, say, −3 dB to 0 dB, and at a position within a coordinate volume of (azimuth, elevation, radius) of, say, ([0,80], [−20,60], [−0.5, 1.0]). This will ensure that the combined audio item is rendered in a way that would be acceptable for both the first and the second audio item.

In some embodiments, the audio encoder 205 may be arranged to adapt the compression of one audio item based on presentation metadata for another audio item.

As a low complexity example, the compression of one audio item may be dependent on the proximity and gain/level for another audio item. E.g. if presentation metadata for the current audio item indicates a position range and a level range, this may be compared to the position range and level range for a second audio item. If a second audio item is constrained to be positioned close to the first audio item and constrained to be rendered at a substantially higher level than the first audio item, then the first audio item is likely to only be marginally perceived by a listener. Accordingly, the encoding of the first audio item may be with a higher compression/bit rate reduction than if no other audio item is present. Specifically, a bit rate allocation for the encoding of the first audio item may depend on the distance to, and level of, one or more other audio items.

In some embodiments, the encoding adapter 213 may be arranged to estimate a masking effect to the first audio item from the second audio item. The masking effect may be represented by a masking measure that indicates a degree of masking introduced to the first audio item from the rendering of the second audio item. The masking measure thus indicates the perceptual significance of the first audio item in the presence of the second audio item.

The masking measure may specifically be generated as an indication of the level of the received sound from the second audio item relative to the level of the received sound from the first audio item when the second audio item is rendered in accordance with the constraints indicated by the presentation metadata.

For example, the masking effect of a first audio item at is lowest gain on a second audio item at its highest gain may be taken to estimate the masking level of the second item, and vice versa.

As another example, the furthest (or e.g. the average) distance between the first and second audio items may be determined and the attenuation between them estimated. The masking effect may then be estimated based on the relative level difference after the compensation for the attenuation.

As another example, if the system employs a nominal listening position, the signal level at the listening position from respectively the first and second audio items may be determined based on the relative gain levels or signal levels and the difference in attenuation from the positions of the sound sources. The audio item positions may be chosen from the allowable positions, e.g. such that the masking effect is minimized (the closest allowable position for the first audio item and the furthest position for the second audio item).

Thus, the encoding adapter 213 may estimate the masking effect to the first audio item from the second audio item based on a gain/level constraint and a position constraint for the second audio item indicated by the input presentation metadata for the second audio item; and often also based on the gain/level constraint and a position constraint for the first audio item indicated by the input presentation metadata for the first audio item.

In some embodiments, the encoding adapter 213 may directly determine a masking threshold for the first audio item based on the presentation metadata for the second audio item and the encoding circuit 211 may proceed to encode the first audio item using the determined masking threshold.

In some embodiments, the adaptation of the encoding by the audio encoder 205 may be an internal process with no other function being adapted accordingly. For example, an irreversible combination of a plurality of audio items into a combined audio item may be performed with the combined audio item being included in the encoded audio data stream and with no indication of how the combined audio item has been created, i.e. without the rendering device performing any specific processing of the combined audio item.

However, in many embodiments, the audio encoder 205 may generate encoding adaptation data that is indicative of how the encoding is adapted in response to the input presentation metadata. This encoding adaptation data may then be included in the encoded audio data stream. In this approach, the rendering device 109 may accordingly have information of the encoding adaptation and may be arranged to adapt the decoding and/or rendering accordingly.

For example, the audio encoder 205 may generate data indicating which audio items of the acoustic environment data are actually combined audio items. It may further indicate some parameters of the combination and indeed these may in many embodiments allow the rendering device 109 to generate representations of the original audio items that were combined. Indeed, in some embodiments, a combined audio item may be generated as a downmix of input audio items and the audio encoder 205 may generate parametric upmix data and include this in the encoded audio data stream thereby enabling the rendering device to perform a reasonable upmixing.

As another example, decoding as such may not be adapted, but the information may be used in the interaction with a listener/end user. For example, multiple audio objects which are deemed to be 'close' in their adaptation constraints may be combined by the encoder into one scene based audio item, while their existence as 'virtual objects' is signalled to the decoder in the encoding adaptation data. The user may then be given this information, and may be offered to manually control the 'virtual sound sources' (although just as a whole since they have been combined in the scene based audio) rather than being informed/aware of the scene based audio as a carrier for the virtual objects.

In some embodiments, the presentation metadata may comprise priority data for one or more audio items and the audio encoder 205 may be arranged to adapt the compression for the first audio item in response to a priority indication for the first audio item.

The priority indication may be a rendering priority indication which is indicative of a perceptual significance or importance of the audio item in the audio scene. For example, it may be used to indicate that an audio item representing a main speaker is more significant than an audio item representing, say, a bird chirping in the background.

The renderer 115 may adapt the rendering based on the priority indications. For example, for listeners with reduced hearing, the renderer 115 may increase the gain for the high priority main dialogue relative to low priority background noise thereby making the speech more intelligible.

Further, the audio encoder 205 may increase compression for reducing priority. For example, in order to combine audio items, it may be required that the priority levels have to be below a given level. As another example, the audio encoder 205 may combine all audio items for which the priority level is below a given level.

In some embodiments, the bit allocation for each audio items may depend on the priority level. For example, bit allocation to the different audio items may be based on an algorithm or formula that considers a plurality of parameters including the priority. The bit allocation for a given audio item may increase monotonically with increasing priority.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Generally, examples of an audio encoding apparatus, a method of encoding audio, and a computer program product which implements the method are indicated by below embodiments.

1. An audio encoding apparatus comprising:
 an audio receiver (201) for receiving a plurality of audio items representing an audio scene;
 a meta data receiver (203) for receiving input presentation metadata for the plurality of audio items, the input presentation metadata describing presentation constraints for the rendering of the plurality of audio items;
 an audio encoder (205) for generating encoded audio data for the audio scene by encoding the plurality of audio items, the encoding being in response to the input presentation metadata;
 a metadata circuit (207) for generating output presentation metadata from the input presentation metadata;
 an output circuit (209) for generating an encoded audio data stream comprising the encoded audio data and the output presentation metadata.

2. The audio encoding apparatus of claim 1 wherein the audio encoder (205) comprises a combiner (215) for generating a combined audio item by combining at least a first audio item and a second audio item of the plurality of audio items in response to input presentation metadata for the first audio item and input presentation metadata for the second audio item, and the audio encoder (205) is arranged to generate combined audio encoding data for the first and second audio item by encoding the combined audio item and to include the combined audio encoding data in the encoded audio data.

3. The audio encoding apparatus of claim 2 wherein the combiner (215) is arranged to select the first audio item and the second audio item from the plurality of audio items in response to the input presentation metadata for the first audio item and for the second audio item.

4. The audio encoding apparatus of claim 2 or 3 wherein the combiner (215) is arranged to select the first audio item and the second audio item in response to a determination that at least some input presentation metadata for the first audio item and input presentation metadata the second audio item meet a similarity criterion.

5. The audio encoding apparatus of claims 2 to 4 wherein the input presentation metadata for the first audio item and the input presentation metadata for the second audio item comprise at least one of a gain constraint and a position constraint.

6. The audio encoding apparatus of any previous claim 2-5 wherein the audio encoder (205) is further arranged to generate combined presentation metadata for the combined audio item in response to the input presentation metadata for the first audio item and the input presentation metadata for the second audio item; and to include the combined presentation metadata in the output presentation metadata.

7. The audio encoding apparatus of claim 6 wherein the audio encoder (205) is arranged to generate at least some combined presentation metadata to reflect a constraint for a presentation parameter for the combined audio item, the constraint being determined as a constraint meeting both a constraint for the first audio item indicated by input presentation metadata for the first audio item and a constraint for the second audio item indicated by input presentation metadata for the second audio item.

8. The audio encoding apparatus of any previous claim wherein the audio encoder (205) is arranged to adapt a compression of a first audio item in response to input presentation metadata for a second audio item.

9. The audio encoding apparatus of claim 8 wherein the audio encoder (205) is arranged to estimate a masking effect to the first audio item from the second audio item in response to input presentation metadata for the second audio item, and to adapt the compression of the first audio item in response to the masking effect.

10. The audio encoding apparatus of claim 9 wherein the audio encoder (205) is arranged to estimate the masking effect to the first audio item from the second audio item in response to at least one of a gain constraint and a position constraint for the second audio item indicated by the input presentation metadata for the second audio item.

11. The audio encoding apparatus of any previous claim 8-10 wherein the audio encoder (205) is further arranged to adapt the compression of the first audio item in response to input presentation metadata for the first audio item.

12. The audio encoding apparatus of any previous claim wherein the input presentation metadata comprises priority data for at least some audio items and the encoder is arranged to adapt a compression for a first audio item in response to a priority indication for the first audio item in the input presentation metadata.

13. The audio encoding apparatus of any previous claim wherein the audio encoder (205) is arranged to generate encoding adaptation data indicative of how the encoding is adapted in response to the input presentation metadata and to include the encoding adaptation data in the encoded audio data stream.

14. A method of encoding audio, the method comprising:
 receiving a plurality of audio items representing an audio scene;
 receiving input presentation metadata for the plurality of audio items, the input presentation metadata describing presentation constraints for the rendering of the plurality of audio items;
 generating encoded audio data for the audio scene by encoding the plurality of audio items, the encoding being in response to the input presentation metadata;
 generating output presentation metadata from the input presentation metadata; and
 generating an encoded audio data stream comprising the encoded audio data and the output presentation metadata.

15. A computer program product comprising computer program code means adapted to perform all the steps of claim 14 when said program is run on a computer.

More specifically, the invention is defined by the appended CLAIMS.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:
1. An audio encoding apparatus comprising:
 an audio receiver circuit,
  wherein the audio receiver circuit is arranged to receive a plurality of audio items,
  wherein the plurality of audio items represent an audio scene;
 a metadata receiver circuit,
  wherein the metadata receiver circuit is arranged to receive input presentation metadata, and
  wherein the input presentation metadata describes presentation constraints for rendering of the plurality of audio items;
 an audio encoder circuit,
  wherein the audio encoder circuit is arranged to generate encoded audio data for the audio scene by encoding the plurality of audio items;
 a metadata circuit,
  wherein the metadata circuit is arranged to generate output presentation metadata from the input presentation metadata,
  wherein the output presentation metadata is arranged to constrain an extent by which a user-adaptable parameter of a rendering system can be adapted by a user when rendering the encoded audio data;
  wherein the extent by which the user-adaptable parameter of the rendering system can be adapted includes a plurality of permissible values of the user-adaptable parameter, and
 an output circuit,
  wherein the output circuit is arranged to generate an encoded audio data stream, wherein the encoded data stream comprises the encoded audio data and the output presentation metadata; and wherein the output presentation metadata comprises at least one of:
an audio item position constraint, and
a reverberation constraint.

2. The audio encoding apparatus of claim 1,
wherein the audio encoder circuit comprises a combiner circuit,
wherein the audio encoder circuit is arranged to generate a combined audio item by combining at least a first audio item and a second audio item from the plurality of audio items in response to input presentation metadata for the first audio item and input presentation metadata for the second audio item,
wherein the audio encoder circuit is arranged to generate combined encoded audio data for the first audio item and the second audio item by encoding the combined audio item,
wherein the encoded audio data comprises the combined encoded audio data.

3. The audio encoding apparatus of claim 2, wherein the combiner circuit is arranged to select the first audio item and the second audio item from the plurality of audio items in response to the input presentation metadata for the first audio item and the input presentation metadata for the second audio item.

4. The audio encoding apparatus of claim 2, wherein the combiner circuit is arranged to select the first audio item and the second audio item in response to a determination that at least a portion of the input presentation metadata for the first audio item and at least a portion of the input presentation metadata for the second audio item meet a similarity criterion.

5. The audio encoding apparatus of claim 2, wherein the input presentation metadata for the first audio item and the input presentation metadata for the second audio item comprise at least one of a gain constraint and a position constraint.

6. The audio encoding apparatus of claim 2,
wherein the audio encoder circuit is arranged to generate combined presentation metadata for the combined audio item in response to the input presentation metadata for the first audio item and the input presentation metadata for the second audio item,
wherein the output presentation metadata comprises the combined presentation metadata.

7. The audio encoding apparatus of claim 6,
wherein the audio encoder circuit is arranged to generate a portion of the combined presentation metadata to reflect a constraint for a presentation parameter,
wherein the presentation parameter is for the combined audio item,
wherein the constraint is determined as a constraint meeting both a constraint for the first audio item and a constraint for the second audio item.

8. The audio encoding apparatus of claim 1, wherein the audio encoder circuit is arranged to adapt a compression of a first audio item in response to input presentation metadata for a second audio item.

9. The audio encoding apparatus of claim 8,
wherein the audio encoder circuit is arranged to estimate a masking effect to the first audio item from the second audio item in response to input presentation metadata for the second audio item, wherein the audio encoder circuit is arranged [to adapt the compression of the first audio item in response to the masking effect.

10. The audio encoding apparatus of claim 9,
wherein the audio encoder circuit is arranged to estimate the masking effect to the first audio item from the second audio item in response to at least one of a gain constraint and a position constraint for the second audio item,
wherein the position constraint is indicated by the input presentation metadata for the second audio item.

11. The audio encoding apparatus of claim 8, wherein the audio encoder circuit is arranged to adapt the compression of the first audio item in response to input presentation metadata for the first audio item.

12. The audio encoding apparatus of claim 1,
wherein the input presentation metadata comprises priority data for a portion of the plurality of audio items,
wherein the encoder circuit is arranged to adapt a compression for a first audio item in response to a priority indication for the first audio item in the input presentation metadata.

13. The audio encoding apparatus of claim 1,
wherein the audio encoder circuit is arranged to generate encoding adaptation data,
wherein the encoding adaptation data is indicative of how the encoding is adapted in response to the input presentation metadata,
wherein the encoded audio data stream comprises the encoding adaptation data.

14. A method of encoding audio, the method comprising:
receiving a plurality of audio items, wherein the plurality of audio items represent an audio scene;
receiving input presentation metadata,
wherein the input presentation metadata describes presentation constraints for rendering of the plurality of audio items;
generating encoded audio data for the audio scene by encoding the plurality of audio items;
generating output presentation metadata from the input presentation metadata,
wherein the output presentation metadata is arranged to constrain an extent by which a user-adaptable parameter of a rendering system can be adapted by a user when rendering the encoded audio data;
wherein the extent by which the user-adaptable parameter of the rendering system can be adapted includes a plurality of permissible values of the user-adaptable parameter, and
generating an encoded audio data stream,
wherein the encoded audio data stream comprises the encoded audio data and the output presentation metadata; and
wherein the output presentation metadata comprises at least one of:
an audio item position constraint, and
a reverberation constraint.

15. The method of claim 14, further comprising:
generating a combined audio item by combining at least a first audio item and a second audio item from the plurality of audio items in response to input presentation metadata for the first audio item and input presentation metadata for the second audio item; and
generating combined encoded audio data for the first audio item and the second audio item by encoding the combined audio item, wherein the encoded audio data comprises the combined encoded audio data.

16. The method of claim 15, further comprising selecting the first audio item and the second audio item from the plurality of audio items in response to the input presentation metadata for the first audio item and for input presentation metadata for the second audio item.

17. The method of claim 15, further comprising selecting the first audio item and the second audio item in response to a determination that at least a portion of the input presentation metadata for the first audio item and at least a portion of the input presentation metadata for the second audio item meet a similarity criterion.

18. The method of claim 15, wherein the input presentation metadata for the first audio item and the input presentation metadata for the second audio item comprise at least one of a gain constraint and a position constraint.

19. The method of claim 15, further comprising
generating combined presentation metadata for the combined audio item in response to the input presentation metadata for the first audio item and the input presentation metadata for the second audio item,
wherein output presentation metadata comprises the combined presentation metadata.

20. A computer-readable non-transitory medium storing a computer program, wherein the computer program, when executed on a processor, performs the method as claimed in claim 14.

* * * * *